United States Patent
De Goes et al.

(10) Patent No.: US 10,861,233 B1
(45) Date of Patent: Dec. 8, 2020

(54) MESH WRAP BASED ON AFFINE-INVARIANT COORDINATES

(71) Applicant: Pixar, Emeryville, CA (US)

(72) Inventors: Fernando Ferrari De Goes, Berkeley, CA (US); Alonso Martinez, Berkeley, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 16/514,779

(22) Filed: Jul. 17, 2019

(51) Int. Cl.
 *G06T 15/00* (2011.01)
 *G06T 17/20* (2006.01)
 *G06F 9/54* (2006.01)
 *G06T 19/20* (2011.01)

(52) U.S. Cl.
 CPC ............ *G06T 17/205* (2013.01); *G06F 9/542* (2013.01); *G06T 19/20* (2013.01); *G06T 2219/2021* (2013.01)

(58) Field of Classification Search
 CPC ....... G06F 9/542; G06T 17/205; G06T 19/20; G06T 2219/2021
 See application file for complete search history.

(56) References Cited

U.S. PATENT DOCUMENTS

| 10,198,860 B1 * | 2/2019 | Smith | G06T 17/20 |
| 2006/0028466 A1 * | 2/2006 | Zhou | G06T 17/20 |
| | | | 345/420 |
| 2016/0364908 A1 * | 12/2016 | Onodera | G06T 11/206 |
| 2017/0161948 A1 * | 6/2017 | Hua | G06T 7/75 |
| 2019/0266796 A1 * | 8/2019 | Comer | B63B 79/10 |
| 2019/0304182 A1 * | 10/2019 | Oh | G06T 17/205 |

OTHER PUBLICATIONS

Zhou et al. "Fast Global Registration", ECCV, 2016, 766-782.
Budninskiy et al. "Spectral Athne-Kernal Embeddings", Eurographics Symposium on Geometry Processing, 2017, vol. 36, No. 5, 13 pages.
Fernando de Goes, Alonso Martinez, "Mesh Wrap based on Affine-Invariant Coordinates", SIGGRAPH, Jul. 28-Aug. 1, 2019, 2 pages.

* cited by examiner

*Primary Examiner* — Charles Tseng
(74) *Attorney, Agent, or Firm* — Patterson + Sheridan, LLP (57) ABSTRACT

Embodiments provide for transferring mesh connectivity. Embodiments include receiving a definition of a correspondence between a first curve for a source mesh and a second curve for a target shape. Embodiments include initializing an output mesh by setting a third plurality of vertices in the output mesh equal to a first plurality of vertices in the source mesh. Embodiments include transforming the output mesh by modifying the third plurality of vertices based on the first curve, the second curve, and a second plurality of vertices of the target mesh. Vertices of the third plurality of vertices that relate to the first curve are conformed to a shape defined by the second curve, and vertex modifications that result in affine transformations of faces in the output mesh are favored. Embodiments include using the output mesh to transfer an attribute from the source mesh to the target shape.

20 Claims, 4 Drawing Sheets

MESH WRAP BASED ON AFFINE-INVARIANT COORDINATES

BACKGROUND

This disclosure relates to computer animation and computer generated imagery. More specifically, this disclosure related to techniques for transferring mesh connectivity between three-dimensional models of different shapes.

With the wide-spread availability of computers, animators and computer graphics artists can rely upon computers to assist in the animation and computer generated imagery process. This may include using computers to have shapes be represented by virtual models in computer memory. This may also include using computers to facilitate animation, for example, by the designing, posing, deforming, coloring, painting, or the like, of characters or other computer-generated models.

The production of animated features and computer generated imagery (CGI) may involve the extensive use of computer graphics techniques to produce a visually appealing image from the geometric description of an object or model that can be used to convey an element of a story. One issue with the production process is the time and effort involved when an animator undertakes to create the geometric description of a model and the model's associated paint data, deformations, and the like. For example, it may take several hours to several days for an animator to design, pose, paint, or otherwise prepare the model for a given state of the production process.

Accordingly, there is a need in the art for techniques of transferring attributes between three-dimensional models of different shapes.

SUMMARY

Embodiments of the present disclosure include a method for transferring mesh connectivity. The method generally includes: receiving a definition of a correspondence between a first curve for a source mesh and a second curve for a target shape; identifying a first plurality of vertices in the source mesh; identifying a second plurality of vertices in the target shape; initializing an output mesh by setting a third plurality of vertices in the output mesh equal to the first plurality of vertices; transforming the output mesh by modifying the third plurality of vertices based on the first curve, the second curve, and the second plurality of vertices, wherein: vertices of the third plurality of vertices that relate to the first curve are conformed to a shape defined by the second curve, and vertex modifications that result in affine transformations of faces in the output mesh are favored over vertex modifications that result in non-affine transformations of the faces in the output mesh; and using the output mesh to transfer an attribute from the source mesh to the target shape.

Other embodiments include a non-transitory computer readable medium comprising instructions that, when executed by one or more processors of a computing system, cause the computing system to perform the method for transferring mesh connectivity described above.

Other embodiments include a system comprising one or more processors and a non-transitory computer readable medium comprising instructions that, when executed by the one or more processors, cause the system to perform the method for transferring mesh connectivity described above.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

A three-dimensional model may be represented by a mesh comprising a collection of vertices, edges and faces defining the shape of a polyhedral object. The faces may be triangles, quadrilaterals, or other types of polygons. Meshes are used as a reference point for defining various attributes of three-dimensional models, such as painting and deformations. In one example, painting of a shirt worn by a character represented by a three-dimensional model is defined relative to vertices, edges, and/or faces of a mesh that wraps the three-dimensional model.

Creating a mesh that wraps a three-dimensional model is a time-consuming process that requires a substantial amount of effort. Furthermore, transferring attributes between models with different meshes generally requires duplication of work, such as re-painting a shirt on a new three-dimensional model that was previously painted on another three-dimensional model. Techniques described herein allow mesh connectivity to be transferred between three-dimensional models of different shapes. Transferring mesh connectivity allows attributes, such as painting and deformations defined with respect to a source mesh on a source shape, to be transferred to a target shape by adapting the source mesh to the target shape.

In certain embodiments, modified forms of iterative closest point (ICP) techniques are used to transfer mesh connectivity. ICP generally involves keeping a collection of points defining a target or reference shape fixed, while a source mesh from a source shape is transformed to best match the target shape. The transformation, which may include translations and/or rotations, is iteratively revised to minimize an error metric, such as a distance from the source mesh to the target shape. Embodiments described herein involve enhancing ICP techniques through curve correspondence and favoring affine transformations, as described in more detail below.

In some embodiments, curve correspondence between a source mesh and a target shape is determined based on input received via a user interface. In an example, a user interface is provided that prompts input of curves defining various features of a source mesh and then corresponding curves defining corresponding features of a target shape.

For example, a user may be prompted via a user interface to provide input defining a curve of a right eyelid on a source mesh. Thereafter, the user may be prompted to provide input defining a corresponding curve of a right eyelid on a target shape. Once these curve correspondences are determined, vertices in the source mesh that fall within shapes defined by the curves on the source mesh are conformed to the shapes defined by corresponding curves on the target shape. ICP techniques may therefore be adapted to favor the curve correspondences rather than simply determining a closest point on the target shape for every vertex of the source mesh.

Furthermore, embodiments described herein involve favoring affine transformations over non-affine transformations. Favoring affine transformations may involve selecting vertex modifications that result in affine transformations of faces in an output mesh over vertex modifications that result in non-affine transformations of the faces in the output mesh. An affine transformation is a transformation that preserves points, straight lines, and planes. Translating, scaling, shearing, and rotating a face within a mesh are examples of affine transformations. By contrast, a transformation that twists part of a face in a mesh is an example of a non-affine transformation. Favoring affine transformations over non-affine transformations generally allows for an improved transference of mesh connectivity by preserving the integrity of the faces in the source mesh. As such, techniques described herein involve variations of ICP that favor curve correspondences and affine transformations when adapting a source mesh to a target shape.

Transferring mesh connectivity from a source mesh to a target shape as described herein provides many benefits. For example, these techniques may substantially reduce the time and effort involved in creating meshes for new three-dimensional shapes. Furthermore, techniques described herein allow attributes of a source mesh, such as painting and deformations, to be transferred to a target shape without requiring these attributes to be redefined for the target shape. For example, embodiments of the present disclosure preserve the integrity of faces in the source mesh when transferring mesh connectivity, attributes can be transferred more accurately between shapes.

Figure 1:
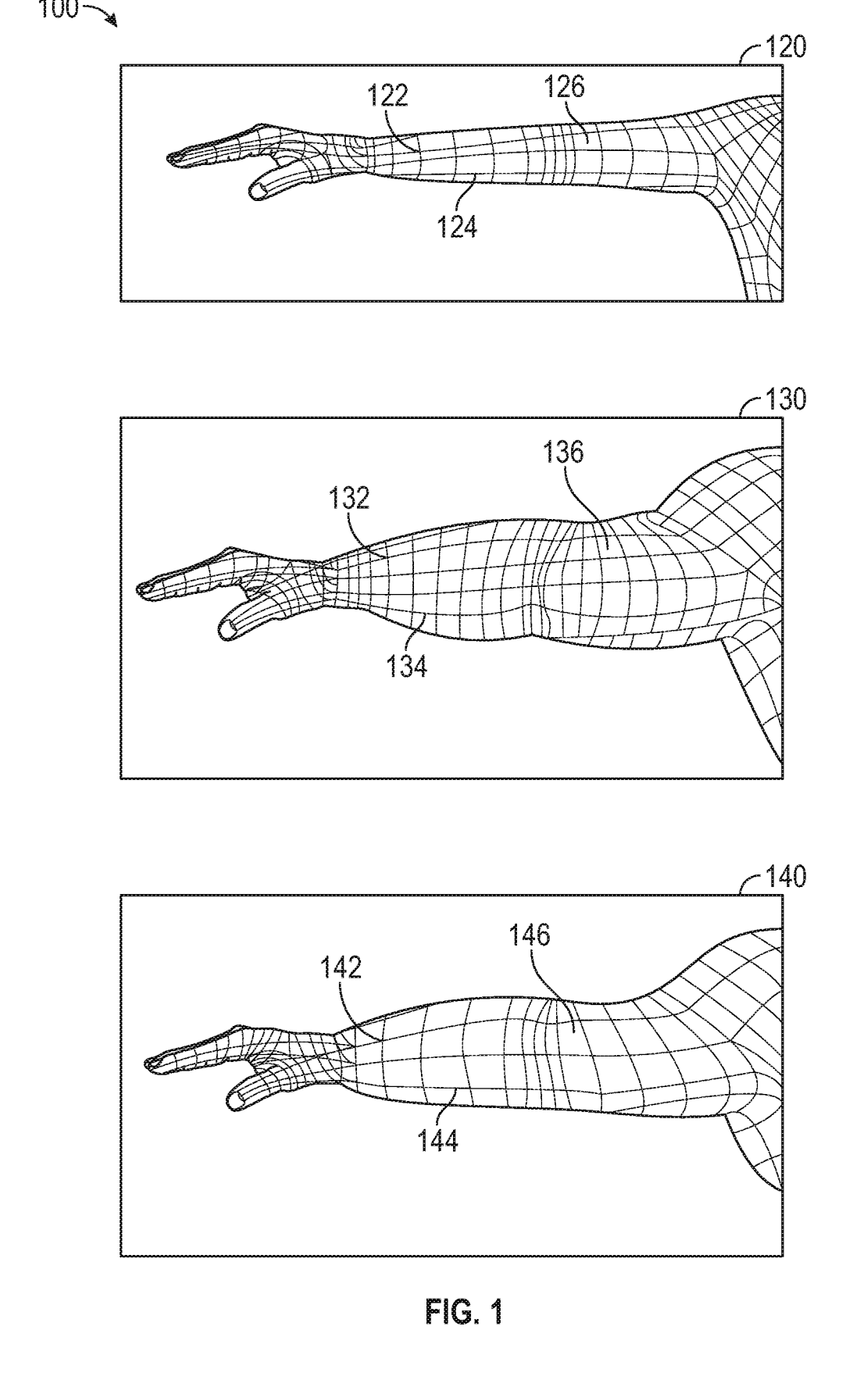
FIG. 1 illustrates an example of transferring mesh connectivity from a source mesh to a target shape.

FIG. 1 illustrates an example 100 of transferring mesh connectivity from a source mesh to a target shape.

Example 100 includes a source mesh 120, which generally represents a mesh describing vertices, edges, and faces of a three-dimensional model from which mesh connectivity between vertices is transferred to a target shape as described herein. In example 100, source mesh 120 is a mesh wrapping an arm of a three-dimensional model of a first character, and includes a plurality of vertices, edges, and faces, such as vertex 122, edge 124, and face 126.

Example 100 also includes a target shape 130, which generally represents a three-dimensional model to which mesh connectivity is transferred from a source mesh as described herein. Target shape 130 is an arm of a three-dimensional model of a second character, and has an existing mesh that includes a plurality of vertices, edges, and faces, such as vertex 132, edge 134, and face 136. Techniques described herein involve transferring mesh connectivity from source mesh 120 to target shape 130 to replace the existing mesh of target shape 130.

Example 100 also includes an output mesh 140, which represents the result of transferring mesh connectivity from source mesh 120 to target shape 130. Output mesh 140 includes a plurality of vertices, edges, and faces, such as vertex 142, edge 144, and face 146. Output mesh 140 shares the tessellation (e.g., tiling or division of vertex sets into polygons suitable for rendering) of source mesh 120, but is fit to the geometry of target shape 130.

Techniques described herein involve generating output mesh 140 by modifying source mesh 120 to fit target shape 130 using optimized ICP techniques in which curve correspondences and affine transformations are favored.

Figure 2A:
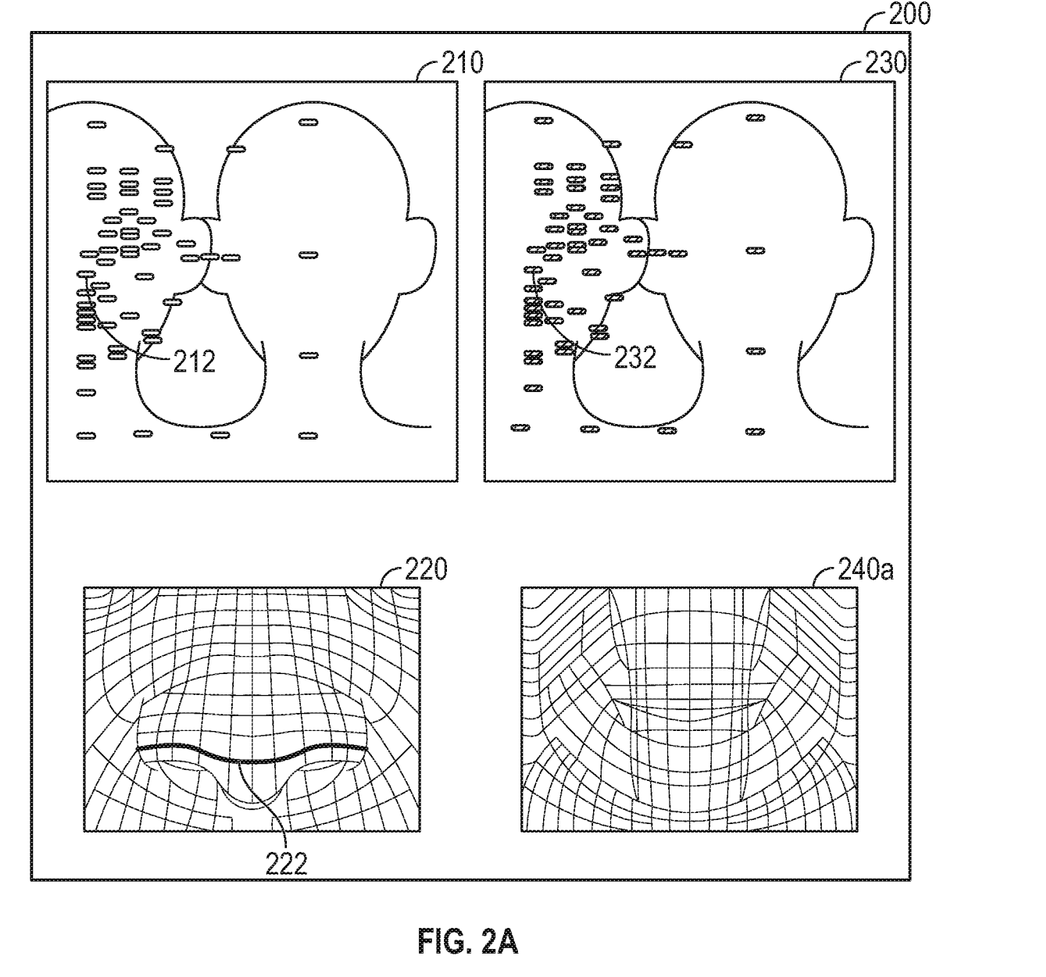
FIGS. 2A and 2B illustrate examples of a user interface for defining curve correspondence between a source mesh and a target shape.
Figure 2B:
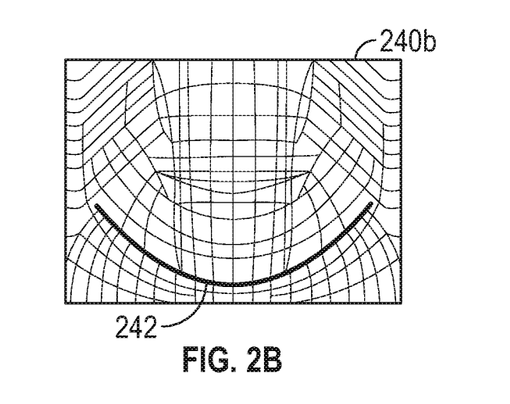

In one example, curve correspondences are determined based on input received via a user interface. In some embodiments, the user interface prompts a user to draw a curve for a feature of source mesh 120 and then to draw a corresponding curve for a corresponding feature of target shape 130. As such, a plurality of corresponding sets of curves between source mesh 120 and the target shape 130 are determined. Receiving curve correspondence data via a user interface is described in more detail below with respect to FIG. 2.

A curve is generally more descriptive than individual points, since it indicates the relative spacing between nearby points in addition to their location. As a consequence, local stretching can be inferred by comparing the arc-length parametrization between pairs of curves and this stretching can then be smoothly interpolated throughout the mesh using techniques described herein. In particular embodiments, corresponding curves are discretized with quadrature points sampled evenly on both source mesh 120 and target shape 130. The samples from target shape 130 are represented by a matrix Q assigning each row to a location of a given sample on target shape 130. The samples from source mesh 120 are encoded by a matrix B with rows set to the generalized coordinates (e.g., barycentric coordinates) that associate each sample with the vertices of source mesh 120.

In an example, a matrix X represents output mesh 140. X comprises a plurality of rows, each row indicating a position (e.g., x, y, and z values) of a vertex $x_i$ in output mesh 140. A matrix Y represents source mesh 120, and similarly comprises a plurality of rows, each row representing a position of a vertex $y_i$ in source mesh 120. X is initialized by setting X equal to Y. X is then transformed using improved ICP techniques described herein to fit target shape 130.

In one example, the geometric discrepancy between source mesh 120 and target shape 130 is accounted for by first defining a projection operator $\Pi$ that maps any mesh vertex $x_i$ to its closest point $p_i = \Pi(x_i)$ on target shape 130, which can be implemented using a bounding volume hierarchy (BVH). A BVH is a tree structure corresponding to a set of geometric objects in which all geometric objects are wrapped in bounding volumes that form the leaf nodes of the tree. The leaf nodes are grouped into sets and enclosed within larger bounding volumes. These larger bounding volumes are also grouped and enclosed within other larger bounding volumes recursively, eventually resulting in a tree structure that has a single bounding volume at the top of the tree.

After the projection operator $\Pi$ is used to project a closest point $p_i$ for a given vertex $x_i$, a score is determined for the projection from $x_i$ to $p_i$. In certain embodiments, the score is represented by $m_i = 1/(1+\mu\|p_i-x_i\|^2)$, with values in the range [0, 1] based on the proximity to target shape 130. The parameter p is a scalar amount that stiffens or increases the attachment between $x_i$ and $p_i$ by multiplying the fitting term $(\|p_i-x_i\|^2)$ that penalizes the distance (squared) between $x_i$ and $p_i$. The larger the value used for p, the larger of a role fitting will play relative to other optimization terms in the equation. Therefore, points that are closer to their projected location are favored to be preserved, while points with smaller scores are relaxed in order to minimize mesh distortion. Relaxing points on a mesh generally means reducing an amount of stretching and/or shearing used to make the target pose reproduce the same point distribution from the source mesh. Mesh distortion generally refers to the amount of stretching and/or shearing related to each vertex when it is deformed from the source to the target pose. By arranging the projection points $p_i$ row-wise in a matrix P and their respective scores $m_i$ in a diagonal matrix M, the fitting error between output mesh 140 and target shape 130 is computed via $\|M(X-P)\|^2$. In some cases, the sample positions from the curve correspondences are reconstructed on output mesh 140 by minimizing $\|BX-Q\|^2$.

Techniques described herein also involve favoring affine transformations during the ICP process, such as by determining whether vertex modifications result in affine transformations in an output mesh, and selecting vertex modifications that result in affine transformations over vertex modifications that result in non-affine transformations. Affine-invariant coordinates (e.g., the coordinates that remain unchanged when an affine transformation is performed) are determined once by preprocessing source mesh 120. For every vertex $x_i$ in source mesh 120, a stencil of size n is collected, the stencil containing every vertex j that shares a face with i. Certain techniques involve assembling a matrix $dY_i = [\ldots, y_j - y_i, \ldots]$ of size 3×n. The local coordinates associated with the vertex i are set to a matrix $W_i$ of size n×(n−3) that spans the nullspace of $dY_i$, i.e., $dY_i W_i = 0$. The row-vectors in $W_i$ define a (n−3)-dimensional embedding of the vertices within the stencil of i that captures its local structure agnostic to affine transformations.

$W_i$ is computed by extracting the right-singular vectors corresponding to zero singular values of the singular value decomposition (SVD) of $dY_i$. A distortion objective is then constructed as a least-squares function $\Sigma_i \|dX_i W_i\|^2$ that evaluates how the source local coordinates $\{W_i\}$ conform to the wrapped vertex stencils $\{dX_i\}$. This expression can further be expanded into a quadratic form $X^T L X$, where L is a Laplacian-like sparse matrix containing the affine-invariant coordinates of source mesh 120. Compared to existing techniques, embodiments of the present disclosure lead to a convex distortion minimization that supports a broad range of deformations (e.g., various affine transformations, such as translating, scaling, shearing, and rotating), while preserving the relative spacing between nearby vertices.

Expressed as a formulaic algorithm, techniques described herein involve initializing the algorithm by setting X=Y. Then, in each of a series of iterations, P is computed by projecting X to target shape 130 as described above. Then, the vertex scores are estimated and set to the diagonal matrix M. X is then updated by optimizing a mix of mesh distortion, fitting error, and curve correspondences expressed by the following formula:

$$\min_X X^T L X + \mu \|M(X-P)\|^2 + \kappa \|BX-Q\|^2,$$

where $\mu$ is the score parameter and $\kappa$ is a stiffness amount (set to 0.1) that enforces the curve correspondences. Since this is a quadratic minimization, X is computed by solving the sparse linear system:

$$(L + \mu M^T M + \kappa B^T B) X = \mu M^T M P + \kappa B^T Q.$$

This linear solve may be implemented using a Cholesky factorization followed by numerical updates at every iteration that incorporate the latest projection scores. Cholesky factorization generally involves a decomposition of a Hermitian, positive-definite matrix into the product of a lower triangular matrix and its conjugate transpose.

Alternating steps may be structured in rounds in order to ramp the contribution of the fitting term up as the optimization progresses. In one example, a small stiffness amount (p=0.1) is used as a starting point, and it is scaled up by an order of magnitude every 10 iterations. The optimization is terminated when the largest projection residual (e.g., the distance between the optimized points and their projections onto the target mesh) is less than $10^{-4}$ or a maximum iteration count is reached.

Once output mesh 140 is determined using the techniques described above, attributes of source mesh 120 can be transferred to target shape 130 via output mesh 140. For example, painting defined with respect to source mesh 120 can be transferred to target shape 130 using output mesh 140, thereby maintaining the integrity of the painting while applying it to a different shape.

FIGS. 2A and 2B illustrate examples of a user interface 200 for defining curve correspondences between a source mesh and a target shape, such as source mesh 120 and target shape 130 of FIG. 1.

FIG. 2A includes user interface 200. In an example, user interface 200 runs on a computing system, such as described below with respect to FIG. 4, and is displayed via a display device. In certain embodiments, user interface 200 allows a user to efficiently define curve correspondence information by prompting the user to provide input defining corresponding curves on a source mesh and a target shape.

For example, component 210 includes a representation of a front and back of a three-dimensional model of a head, the geometry of which is defined by a source mesh that is not shown, with a plurality of tags that indicate where curves are suggested by the user interface to be input (e.g., because these are locations defining notable features of the model, such as eyes, nose, and mouth). In certain embodiments, each tag is associated with a particular feature of the head. For example, tag 212 is associated with the nose of the head. When the user selects tag 212, component 220 is displayed within user interface 200, thereby allowing the user to provide input defining curves, such as curve 222. The user may define curve 222, for example, by providing input via a touchscreen, mouse, keyboard, or other input device. Curve 222 represents a portion of the nose of the source mesh.

Component 230 corresponds to a target shape, and similarly includes a plurality of tags that indicate where curves are suggested to be input that correspond to the curves defined for the source mesh. Tag 232 is associated with the nose of the target shape, and corresponds to tag 212 on the source mesh. When the user selects tag 232, component 240a is displayed within user interface 200. In FIG. 2A, the user has not yet defined a curve for tag 232 on the target shape corresponding to curve 222 on the source mesh.

In FIG. 2B, component 240b shows that the user has defined curve 242 for tag 232. Component 240b represents component 240a of FIG. 2A after the user has provided input defining curve 242. Curve 242 represents a portion of the nose of the target shape that corresponds to portion of the nose of the source mesh represented by curve 222.

While FIGS. 2A and 2B illustrate defining two corresponding curves 222 and 242, it is noted that the user will generally define corresponding curves and/or points for every pair of corresponding tags on the source mesh and target shape shown in user interface 200.

Curves 222 and 242 may be associated with an index that identifies the feature to which they relate. As described above, curves 222 and 242 may be discretized and used as part of a process for transferring mesh connectivity from the source mesh to the target shape. In an example, curves 222 and 242 are discretized with quadrature points sampled evenly from each. The samples from curve 242 are represented by a matrix Q assigning each row to a location of a given sample on the target shape. The samples from curve 222 are encoded by a matrix B with rows set to the generalized coordinates (e.g., barycentric coordinates) that associate each sample with the vertices of the source mesh. As described above with respect to FIG. 1, matrices Q and B may be used as part of a process for transferring the connectivity of the source mesh to the target shape.

In an example, a modified form of ICP that favors the correspondence between curves, such as curves 222 and 242, and that favors affine transformations is used to determine an output mesh.

Figure 3:
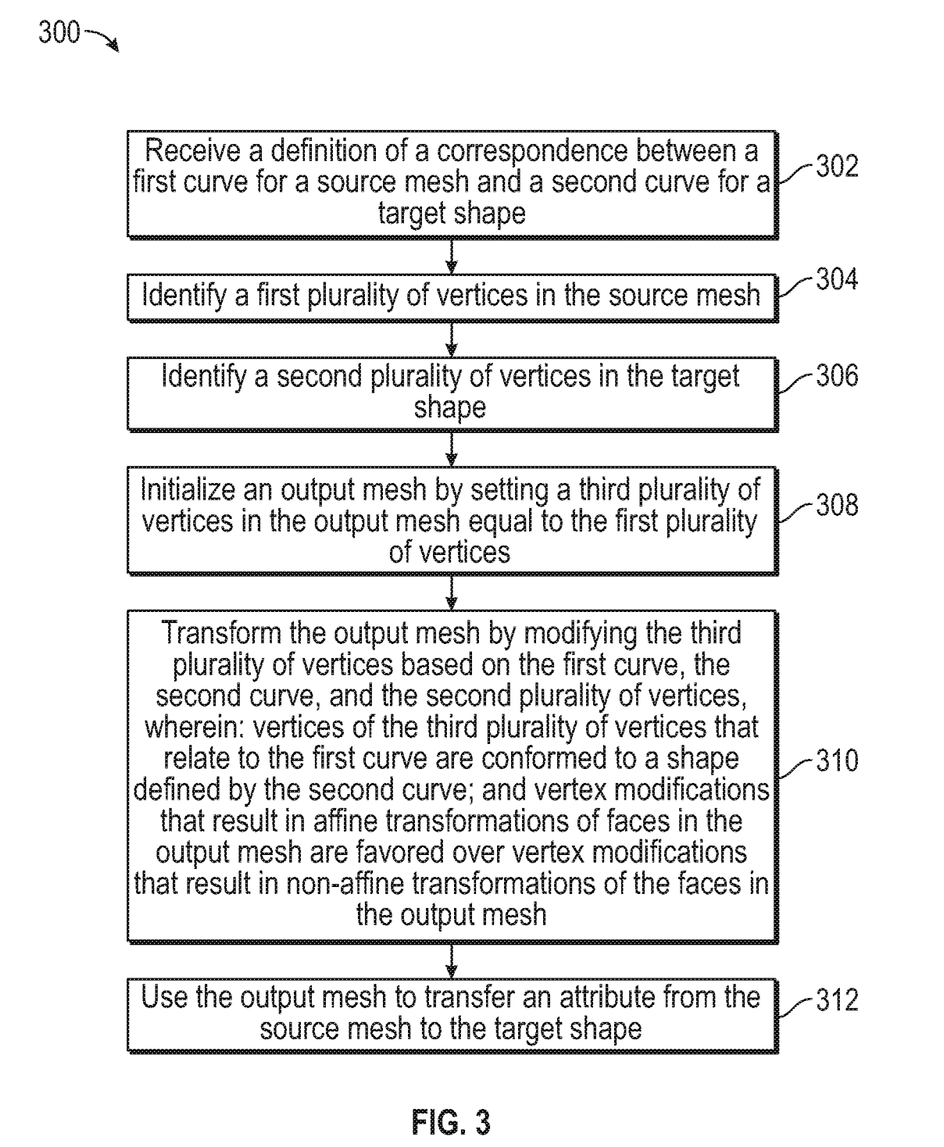
FIG. 3 illustrates example operations for transferring mesh connectivity from a source mesh to a target shape.

FIG. 3 illustrates example operations 300 for transferring mesh connectivity from a source mesh to a target shape. Operations 300 may be performed by a computing system, such as computing system 400 of FIG. 4.

Operations 300 begin at 302, where a definition of a correspondence between a first curve for a source mesh and a second curve for a target shape is received. For example, the computing system may receive the definition via a user interface, such as user interface 200 of FIG. 2. In some embodiments, the computer system performs processing such as discretization on the first curve and the second curve, as described above with respect to FIG. 1. For example, the computer system may discretize the first curve and the second curve with quadrature points sampled evenly from the source mesh and the target shape.

In some embodiments, receiving the definition of the correspondence between the first curve for the source mesh and the second curve for the target shape comprises providing, via a user interface, a series of prompts for curve correspondence information and receiving, via the user interface, in response to respective prompts of the series of prompts, input identifying the first curve and the second curve.

At 304, a first plurality of vertices in the source mesh is identified. In an example, the computing system stores positions of the first plurality of vertices in a matrix Y, as described above with respect to FIG. 1.

At 306, a second plurality of vertices in the target shape is identified.

At 308, an output mesh is initialized by setting a third plurality of vertices in the output mesh equal to the first plurality of vertices.

At 310, the output mesh is transformed by modifying the third plurality of vertices based on the first curve, the second curve, and the second plurality of vertices, wherein: vertices of the third plurality of vertices that relate to the first curve are conformed to a shape defined by the second curve; and vertex modifications that result in affine transformations of faces in the output mesh are favored over vertex modifications that result in non-affine transformations of the faces in the output mesh. In an example, the computing system performs improved ICP techniques described above with respect to FIG. 1 in order to iteratively transform the output mesh to fit the target shape, favoring the curve correspondences defined at 302 and favoring affine transformations over non-affine transformations.

In some embodiments, transforming the output mesh comprises, for each respective vertex of the third plurality of vertices, determining a given vertex of the second plurality of vertices that is nearest to the respective vertex, determining a confidence score for an association between the respective vertex and the given vertex, and modifying the respective vertex based on the given vertex and the confidence score. In certain embodiments, modifying the respective vertex based on the given vertex and the confidence score comprises iteratively modifying the first respective vertex to minimize the confidence score. In some examples, the confidence score represents a distance from the source mesh to the target shape In some embodiments, favoring vertex modifications that result in affine transformations of the faces in the output mesh over vertex modifications that result in non-affine transformations of the faces in the output mesh comprises, for a particular vertex of the third plurality of vertices, identifying a set of vertices of the third plurality of vertices that share a face with the particular vertex, and determining, based on the set of vertices, whether a given vertex modification comprises an affine transformation. If the given vertex modification is determined to comprise an affine transformation, then the given vertex modification may be performed. If the given vertex modification is determined not to comprise an affine transformation, then the given vertex modification may, in some instances, not be performed. Instead, a different vertex modification that is determined to be an affine transformation may be performed.

In some examples, transforming the output mesh comprises reconstructing the quadrature points sampled from the source mesh and the target shape on the output mesh.

At 312, the output mesh is used to transfer an attribute from the source mesh to the target shape. In an example, painting or deformations defined with respect to the source mesh are transferred to the target shape via the output mesh, which maintains the tessellation of the source mesh but fit to the target shape. In some embodiments, the output mesh may be used to animate a character corresponding to the output mesh that is different from a character corresponding to the source mesh. Such an animation be used in content (e.g., a film or tv programming) that is presented to one or more viewers.

Figure 4:
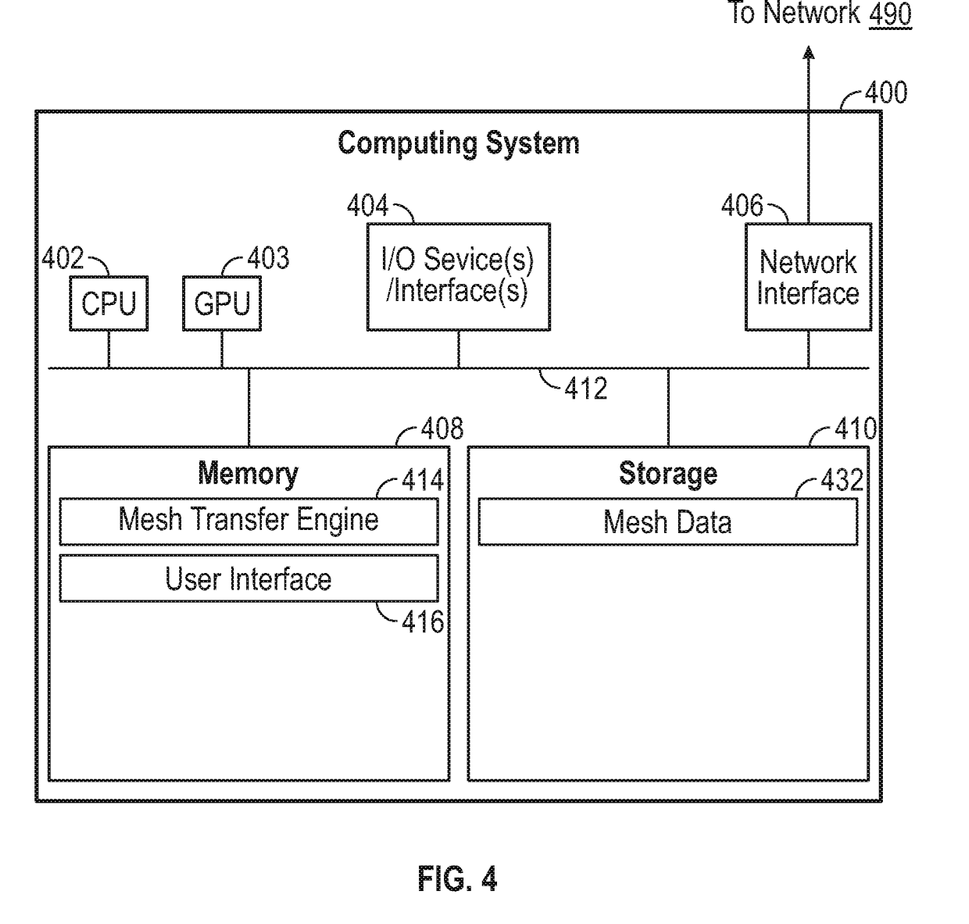
FIG. 4 illustrates an example computing system with which embodiments of the present disclosure may be implemented.

FIG. 4 illustrates an example computing system 400 with which embodiments of the present disclosure may be implemented. In certain embodiments, computing system 400 performs techniques described herein for transferring mesh connectivity from a source mesh to a target shape, such as operations 300 of FIG. 3.

Computing system 400 includes a central processing unit (CPU) 402 and a graphics processing unit (GPU), both of which are connected to a data bus 412. CPU 402 and GPU 403 are configured to process computer-executable instructions, e.g., stored in memory 408 or storage 410, and to cause computing system 400 to perform methods as described herein, for example with respect to FIG. 3. Though depicted as only including only CPU 402 and GPU 403, computing system 400 may alternatively have one processor or a plurality of processors.

Computing system 400 further includes input/output device(s) and interface(s) 404, which allows computing system 400 to interface with input/output devices, such as, for example, keyboards, displays, mouse devices, pen input, and other devices that allow for interaction with computing system 400. Note that while not depicted with independent external I/O devices, computing system 400 may connect with external I/O devices through physical and wireless connections (e.g., an external display device).

Computing system 400 further includes network interface 406, which provides computing system 400 with access to external networks, such as network 490, and thereby external computing devices.

Computing system 400 further includes memory 408, which in this example includes mesh transfer engine 414, which may perform operations described above with respect FIG. 1-3, such as the operations 300 of FIG. 3. Memory 408 further includes user interface 416, which is generally representative user interface 200 of FIG. 2. While mesh transfer engine 414 and user interface 416 are depicted as separate components, it is noted that they may alternatively be implemented as a single component.

Note that while shown as a single memory 408 in FIG. 4 for simplicity, the aspects stored in memory 408 may be stored in different physical memories, but all accessible to CPU 402 and/or GPU 403 via data connections, such as bus 412.

Computing system 400 further includes storage 410, which in this example includes mesh data 432. Mesh data 432 generally represents data related to source meshes, target shapes, and output meshes. For example, mesh data 432 may include matrices storing information related to meshes and shapes, such as positions of vertices, edges, and/or faces of source mesh 120, target shape 130, and output mesh 140 of FIG. 1, as well as curve correspondence information, such as definitions of curves 222 and 242 of FIG. 2.

While not depicted in FIG. 4, other aspects may be included in storage 410.

As with memory 408, a single storage 410 is depicted in FIG. 4 for simplicity, but the various aspects stored in storage 410 may be stored in different physical storages, but all accessible to CPU 402 and/or GPU 403 via internal data connections, such as bus 412, I/O interfaces 404, or external connection, such as network interface 406.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for transferring mesh connectivity, comprising:
   receiving a definition of a correspondence between a first curve for a source mesh and a second curve for a target shape;
   identifying a first plurality of vertices in the source mesh;
   identifying a second plurality of vertices in the target shape;
   initializing an output mesh by setting a third plurality of vertices in the output mesh equal to the first plurality of vertices;
   transforming the output mesh by modifying the third plurality of vertices based on the first curve, the second curve, and the second plurality of vertices, wherein:
      vertices of the third plurality of vertices that relate to the first curve are conformed to a shape defined by the second curve, and
      vertex modifications that result in affine transformations of faces in the output mesh are favored over vertex modifications that result in non-affine transformations of the faces in the output mesh; and
   using the output mesh to transfer an attribute from the source mesh to the target shape.

2. The computer-implemented method of claim 1, wherein transforming the output mesh comprises:
   for each respective vertex of the third plurality of vertices:
      determining a given vertex of the second plurality of vertices that is nearest to the respective vertex;
      determining a confidence score for an association between the respective vertex and the given vertex; and
      modifying the respective vertex based on the given vertex and the confidence score.

3. The computer-implemented method of claim 2, wherein modifying the respective vertex based on the given vertex and the confidence score comprises iteratively modifying the respective vertex to minimize the confidence score, wherein the confidence score represents a distance from a modified source mesh to the target shape.

4. The computer-implemented method of claim 1, wherein favoring the vertex modifications that result in the affine transformations of the faces in the output mesh over the vertex modifications that result in the non-affine transformations of the faces in the output mesh comprises, for a particular vertex of the third plurality of vertices:
   identifying a set of vertices of the third plurality of vertices that share a face with the particular vertex;
   determining, based on the set of vertices, whether a given vertex modification comprises a given affine transformation; and
   determining whether to perform the given vertex modification based on whether the given vertex modification comprises the given affine transformation.

5. The computer-implemented method of claim 1, wherein receiving the definition of the correspondence between the first curve for the source mesh and the second curve for the target shape comprises:
   providing, via a user interface, a series of prompts for curve correspondence information; and
   receiving, via the user interface, in response to respective prompts of the series of prompts, input identifying the first curve and the second curve.

6. The computer-implemented method of claim 5, further comprising discretizing the first curve and the second curve with quadrature points sampled evenly from the source mesh and the target shape.

7. The computer-implemented method of claim 6, wherein transforming the output mesh comprises reconstructing the quadrature points sampled from the source mesh and the target shape on the output mesh.

8. A non-transitory computer readable medium comprising instructions that, when executed by one or more processors of a computing system, cause the computing system to perform a method for transferring mesh connectivity, the method comprising:
   receiving a definition of a correspondence between a first curve for a source mesh and a second curve for a target shape;
   identifying a first plurality of vertices in the source mesh;
   identifying a second plurality of vertices in the target shape;
   initializing an output mesh by setting a third plurality of vertices in the output mesh equal to the first plurality of vertices;
   transforming the output mesh by modifying the third plurality of vertices based on the first curve, the second curve, and the second plurality of vertices, wherein:
      vertices of the third plurality of vertices that relate to the first curve are conformed to a shape defined by the second curve, and
      vertex modifications that result in affine transformations of faces in the output mesh are favored over vertex modifications that result in non-affine transformations of the faces in the output mesh; and
   using the output mesh to transfer an attribute from the source mesh to the target shape.

9. The non-transitory computer readable medium of claim 8, wherein transforming the output mesh comprises:
   for each respective vertex of the third plurality of vertices:
      determining a given vertex of the second plurality of vertices that is nearest to the respective vertex;
      determining a confidence score for an association between the respective vertex and the given vertex; and
      modifying the respective vertex based on the given vertex and the confidence score.

10. The non-transitory computer readable medium of claim 9, wherein modifying the respective vertex based on the given vertex and the confidence score comprises iteratively modifying the respective vertex to minimize the confidence score, wherein the confidence score represents a distance from a modified source mesh to the target shape.

11. The non-transitory computer readable medium of claim 8, wherein favoring the vertex modifications that result in the affine transformations of the faces in the output mesh over the vertex modifications that result in the non-affine transformations of the faces in the output mesh comprises, for a particular vertex of the third plurality of vertices:
   identifying a set of vertices of the third plurality of vertices that share a face with the particular vertex;

determining, based on the set of vertices, whether a given vertex modification comprises a given affine transformation; and determining whether to perform the given vertex modification based on whether the given vertex modification comprises the given affine transformation.

12. The non-transitory computer readable medium of claim 8, wherein receiving the definition of the correspondence between the first curve for the source mesh and the second curve for the target shape comprises:

providing, via a user interface, a series of prompts for curve correspondence information; and receiving, via the user interface, in response to respective prompts of the series of prompts, input identifying the first curve and the second curve.

13. The non-transitory computer readable medium of claim 12, wherein the method further comprises discretizing the first curve and the second curve with quadrature points sampled evenly from the source mesh and the target shape.

14. The non-transitory computer readable medium of claim 13, wherein transforming the output mesh comprises reconstructing the quadrature points sampled from the source mesh and the target shape on the output mesh.

15. A system, comprising:

one or more processors; and a non-transitory computer readable medium comprising instructions that, when executed by the one or more processors, cause the system to perform a method for transferring mesh connectivity, the method comprising:

receiving a definition of a correspondence between a first curve for a source mesh and a second curve for a target shape;

identifying a first plurality of vertices in the source mesh;

identifying a second plurality of vertices in the target shape;

initializing an output mesh by setting a third plurality of vertices in the output mesh equal to the first plurality of vertices;

transforming the output mesh by modifying the third plurality of vertices based on the first curve, the second curve, and the second plurality of vertices, wherein:

vertices of the third plurality of vertices that relate to the first curve are conformed to a shape defined by the second curve, and vertex modifications that result in affine transformations of faces in the output mesh are favored over vertex modifications that result in non-affine transformations of the faces in the output mesh; and using the output mesh to transfer an attribute from the source mesh to the target shape.

16. The system of claim 15, wherein transforming the output mesh comprises:

for each respective vertex of the third plurality of vertices:

determining a given vertex of the second plurality of vertices that is nearest to the respective vertex;

determining a confidence score for an association between the respective vertex and the given vertex; and modifying the respective vertex based on the given vertex and the confidence score.

17. The system of claim 16, wherein modifying the respective vertex based on the given vertex and the confidence score comprises iteratively modifying the respective vertex to minimize the confidence score, wherein the confidence score represents a distance from a modified source mesh to the target shape.

18. The system of claim 15, wherein favoring the vertex modifications that result in the affine transformations of the faces in the output mesh over the vertex modifications that result in the non-affine transformations of the faces in the output mesh comprises, for a particular vertex of the third plurality of vertices:

identifying a set of vertices of the third plurality of vertices that share a face with the particular vertex;

determining, based on the set of vertices, whether a given vertex modification comprises a given affine transformation; and determining whether to perform the given vertex modification based on whether the given vertex modification comprises the given affine transformation.

19. The system of claim 15, wherein receiving the definition of the correspondence between the first curve for the source mesh and the second curve for the target shape comprises:

providing, via a user interface, a series of prompts for curve correspondence information; and receiving, via the user interface, in response to respective prompts of the series of prompts, input identifying the first curve and the second curve.

20. The system of claim 19, wherein the method further comprises discretizing the first curve and the second curve with quadrature points sampled evenly from the source mesh and the target shape.

* * * * *